UNITED STATES PATENT OFFICE.

SAMUEL LEWIS SUMMERS, OF PHILADELPHIA, PENNSYLVANIA.

METHYLENE DI-ACETO DI-SALICYLIC ACID AND PROCESS OF MAKING SAME.

SPECIFICATION forming part of Letters Patent No. 707,178, dated August 19, 1902.

Application filed May 10, 1902. Serial No. 106,692. (No specimens.)

*To all whom it may concern:*

Be it known that I, SAMUEL LEWIS SUMMERS, a citizen of the United States, residing at Philadelphia, in the State of Pennsylvania, have invented certain new and useful Methylene Di-Aceto Di-Salicylic Acid and Process of Producing the Same, of which the following is a full, clear, and exact description.

My invention relates to the production of a new chemical body having especial utility for its medicinal properties as a pharmaceutical product.

It has for its object to produce in crystalline form a body in which one methylene group ($CH_2$) shall have united two molecules of the acetyl-salicylic group

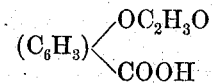

To that end my invention consists in the discovery that such a body may be produced, in a novel method of producing the same, and in the new body so produced.

In carrying out my process and producing the new body, which may properly be termed "methylene di-aceto di-salicylic acid," I prefer to use as a starting material the methylene di-salicylic acid discovered by me and described in my pending application for United States Patent therefor, Serial No. 104,821, filed April 26, 1902. That substance is a creamy-white impalpable powder having a melting-point of 245° centigrade and an empiric formula $C_{15}H_{12}O_6$, as therein set forth, and consists of two salicylic-acid molecules deprived of one hydrogen atom in each and united, by means of a condensing reaction, with formaldehyde, whereby the latter is deoxidized, leaving the methylene group ($CH_2$) united with and combining the two unsaturated salicylic-acid molecules. Of this starting material I take two hundred and eighty-eight parts, by weight, add thereto three hundred and six parts of acetic anhydrid, boiling the mixture with a reflux condenser for two to three hours, and then remove the excess of the acetylizing agent by distillation under reduced pressure. The new body in an unpurified state thereupon results. It is to be purified perfectly by removal of the last trace of acetic anhydrid, this being suitably done by mixing it while still hot with half its volume of benzene, allowing the benzene to evaporate spontaneously, whereupon the new product described will crystallize out in white and microscopically small crystals, the crystallization being speeded by placing it over sulfuric acid.

The new body is obviously a di-acetyl derivative of methylene di-salicylic acid. It has the empiric formula $C_{19}H_{16}O_8$ and may be further described by the structural formula

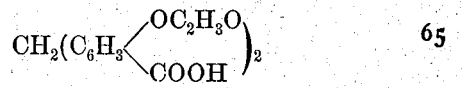

It has a melting-point of about 145° centigrade, is tasteless, and insoluble in water, but very soluble in alcohol and ether.

Having thus described my invention, what I claim as new, and desire to secure by Letters Patent, is—

1. The new product described, which may be denominated methylene di-aceto di-salicylic acid, is white in color, is of microscopically small crystalline structure, tasteless, melts at about 145° centigrade, has the empiric formula $C_{19}H_{16}O_8$, and is insoluble in water but soluble in ether and alcohol.

2. The process described, of producing the di-acetyl derivative of methylene di-salicylic acid, which consists in subjecting the last-named body as a starting material to an acetylizing reaction by means of acetic anhydrid under heat and pressure, then crystallizing the resultant product and finally purifying the same.

In testimony whereof I have hereunto affixed my signature this 8th day of May, A. D. 1902.

SAMUEL LEWIS SUMMERS.

Witnesses:
 GEO. W. REED,
 H. T. FENTON.